United States Patent
Stewart et al.

(10) Patent No.: US 6,384,844 B1
(45) Date of Patent: May 7, 2002

(54) METHOD AND APPARATUS FOR USE IN ENTERING FINANCIAL DATA INTO AN ELECTRONIC DEVICE

(75) Inventors: Whitney Stewart, San Francisco, CA (US); James R. Schmidt, Eagan, MN (US); Neil Clark Godfrey, Costa Mesa, CA (US)

(73) Assignee: eFunds Corporation, Milwaukee, WI (US)

( * ) Notice: Subject to any disclaimer, the term of this patent is extended or adjusted under 35 U.S.C. 154(b) by 0 days.

(21) Appl. No.: 09/587,738

(22) Filed: Jun. 5, 2000

Related U.S. Application Data

(60) Provisional application No. 60/168,272, filed on Dec. 1, 1999, provisional application No. 60/168,276, filed on Dec. 1, 1999, and provisional application No. 60/168,273, filed on Dec. 1, 1999.

(51) Int. Cl.[7] .................................................. G09G 5/00
(52) U.S. Cl. ........................ 345/764; 705/35; 382/139; 345/780
(58) Field of Search .................................. 382/137, 139; 705/35, 45; 345/326, 348, 339, 349, 354, 962, 333, 700, 835, 764, 839, 840; 235/379

(56) References Cited

U.S. PATENT DOCUMENTS

| | | | |
|---|---|---|---|
| 4,947,321 A | | 8/1990 | Spence et al. |
| 5,053,607 A | * | 10/1991 | Carlson et al. ................ 705/18 |
| 5,120,944 A | * | 6/1992 | Kern et al. ................... 235/379 |
| 5,484,988 A | | 1/1996 | Hills et al. |
| 5,696,909 A | | 12/1997 | Wallner |
| 5,740,271 A | * | 4/1998 | Kunkler et al. .............. 382/137 |
| 5,905,248 A | * | 5/1999 | Russell et al. .......... 235/462.27 |
| 5,940,844 A | * | 8/1999 | Cahill et al. ................. 707/526 |
| 6,006,208 A | * | 12/1999 | Forst et al. .................... 705/39 |
| 6,164,528 A | * | 12/2000 | Hills et al. ................... 235/379 |

OTHER PUBLICATIONS

PayByCheck.com—Product Demonstration displayed at http://www.paybycheck.com/demo.html.
PayByCheck.com—Product Demonstration displayed at http://www.paybycheck.com/demo2.html.

\* cited by examiner

*Primary Examiner*—Raymond J. Bayerl
*Assistant Examiner*—Tadesse Hailu
(74) *Attorney, Agent, or Firm*—Michael Best & Friedrich LLP

(57) ABSTRACT

An entry system for use in entering financial data, such as magnetic ink character recognition (MICR) characters, to an electronic device. The entry system includes a data input device connected to the electronic device and operable to allow the user to input data to the electronic device. The system also includes a software program for use in connection with the electronic device and being operable to generate computer recognizable financial data characters in response to the input data from the user.

58 Claims, 3 Drawing Sheets

METHOD AND APPARATUS FOR USE IN
ENTERING FINANCIAL DATA INTO AN
ELECTRONIC DEVICE

RELATED APPLICATIONS

This application claims the benefit under 35 U.S.C. § 119 of U.S. Provisional Application No. 60/168,272, entitled METHOD AND APPARATUS FOR USE IN ENTERING FINANCIAL DATA INTO AN ELECTRONIC DEVICE, filed on Dec. 1, 1999, U.S. Provisional Application No. 60/168,276, entitled METHOD AND APPARATUS FOR AN ELECTRONIC CHECK PAYMENT SYSTEM, filed on Dec. 1, 1999, and U.S. Provisional Application No. 60/168,273, entitled METHOD AND APPARATUS FOR PROVIDING ONLINE FINANCIAL ACCOUNT SERVICES, filed on Dec. 1, 1999.

BACKGROUND OF THE INVENTION

This invention relates to a method and apparatus for use in entering financial data into an electronic device and, particularly, to a method and apparatus for use in entering magnetic ink character recognition (MICR) characters into a computer.

Individuals, businesses, government agencies, and other institutions of all types issue paper checks to make payments to merchants, creditors and other providers of goods and services in the United States and internationally. In a traditional payment transaction, a purchaser (the payor), presents a physical (i.e. paper) check to a merchant selling goods or services (the payee). One of the key elements on the physical check is a magnetic ink character recognition (MICR) code line (the "MICR line"), which is usually located on the bottom of the financial document. The MICR line includes a series of characters necessary for financial institutions and others to process the check. For a physical check, the MICR line is composed of at least two fields which can be read by a special MICR reader/sorter that can distinguish the magnetic ink characters.

The MICR line characters include decimal numbers from 0 to 9 and MICR symbols. The MICR symbols allow the MICR reader to distinguish among the different fields in the MICR line. A first MICR symbol is called an "on-us" indicator. The issuing financial institution (i.e., the financial institution on which the check is drawn) determines the content of the "on-us" field. Usually, the "on-us" field identifies the account number of the account on which the check is drawn. However, other information can be disclosed in the "on-us" field and more than one on-us field can be added to a paper check. A second MICR symbol is called a transit symbol. The transit symbol is always used in pairs on both sides of a transit or routing number. The routing number, which is 9 digits long, identifies the financial institution on which the check is drawn. A third MICR symbol is called a dash symbol. The dash symbol is used as a separator within the "on-us" field and can be used in whatever way the issuing financial institution wants to use it.

SUMMARY OF THE INVENTION

One of the problems with an electronic check transaction is that the payor often fails to properly enter the MICR line data into an electronic device. For example, one system and method for allowing a user to enter the MICR line into an electronic device is to provide separate fields on a display for the user to enter the appropriate data. In this system there is one field for entering the routing/transit number and a separate field for entering the on-us number. The purchaser is required to properly enter the correct information in the appropriate fields. However, errors often occur because the purchaser of the goods or services is not aware of what information should go in each respective field. Accordingly, a better system and method for entering the MICR line is required.

The financial data entry system and method of the invention allows for a user to enter the MICR line data as seen on a financial document (e.g., a physical check) directly into a point of sale terminal or other computer input device. The user simply inputs all of the MICR numbers and symbols shown on the MICR line. This results in fewer errors because the purchaser is not required to distinguish among the different fields in the MICR line.

The entry system of the invention also provides basic typographical data validation routines at a server. The typographical validation routines help prevent the server from declining payment due to typographical errors by a purchaser. In other words, the typographical validation routines will provide a first level of data validation before the MICR code line is further processed for payment of the goods or services.

Accordingly, the invention provides a system for use in entering financial data, such as magnetic ink character recognition (MICR) characters, to an electronic device (e.g., a computer). The system includes a data input device (e.g., a "mouse" or keypad) connected to the electronic device and operable to allow the user to input data to the electronic device. The system also includes a software program for use in connection with the electronic device and being operable to generate computer recognizable financial data characters in response to the input data from the user.

The invention further provides an entry system for use in entering magnetic ink character recognition (MICR) characters to an electronic device. The entry system includes a data input device in communication with the electronic device, a visual display unit in communication with the electronic device, and a software program for use in connection with the electronic device. The software program is operable to generate a command signal causing a plurality of virtual entry buttons to be displayed by the visual display unit. Each virtual entry button corresponds to a respective MICR character. In addition, the software program is operable to generate a respective computer recognizable code in response to user activation of one of the virtual entry buttons.

The invention further provides a system for use in entering magnetic ink character recognition (MICR) characters to an electronic device. The system includes a manual data entry device in communication with the electronic device. The manual data entry device is operable to allow a user to input the MICR characters to the electronic device. The system further includes a software program for use in connection with the electronic device. The software program is operable to generate computer recognizable code corresponding to the MICR characters.

The invention further provides a method of entering data into an electronic device. The method includes providing a data input device (e.g., a "mouse" or keypad) connected to the electronic device (e.g., computer). The method also provides for entering data corresponding to MICR characters, and converting the data to computer recognizable ASCII code.

The invention further provides a method of entering a magnetic ink character recognition (MICR) line into an electronic device where the MICR line includes a plurality of MICR line characters. The method includes the acts of providing a manual data entry device in communication with the electronic device, inputting the first MICR line character with the pointer device, converting the first MICR line character into a first computer recognizable code, and repeating the acts of inputting the MICR line character and converting the MICR line character for the remaining plurality of MICR line characters.

It is an advantage of the invention to provide an entry system for use in entering a MICR line into an on-line financial Web site where the purchaser can enter the MICR line as seen on a financial document.

It is another advantage of the invention to allow the user to enter the MICR code line as seen on the financial document without having the user interpret the MICR code line.

It is yet another advantage of the invention to perform typographical data validation routines to minimize the number of decline responses due to typographical errors.

Other features and advantages of the invention are set forth in the following detailed description, drawings and claims.

Before one embodiment of the invention is explained in fall detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 1:
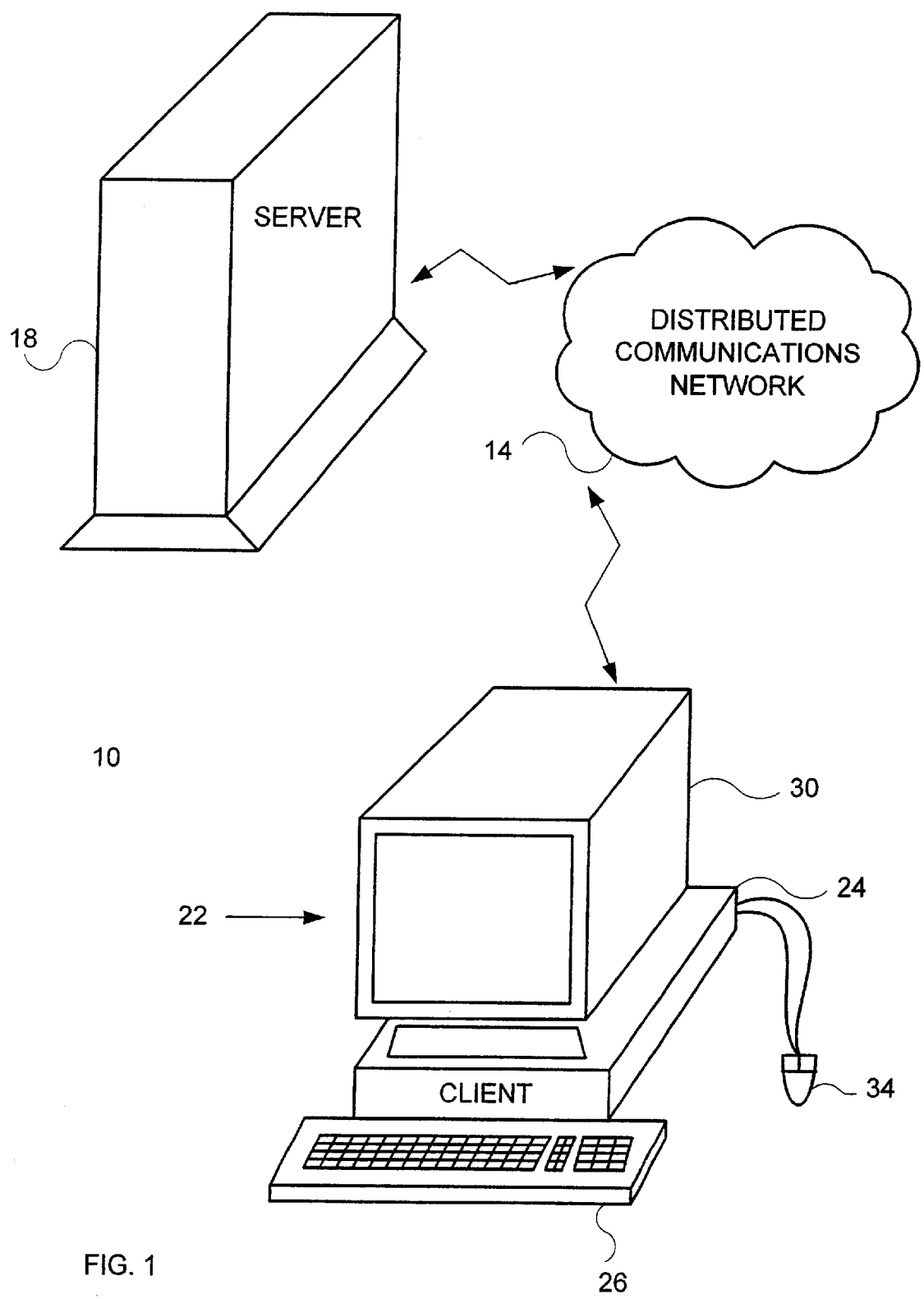
FIG. 1 is a representative diagram of an entry system for use in entering financial data to a financial data entry program.

Shown in FIG. 1 of the drawings is an entry system 10 embodying the invention. The entry system is for use in entering financial data, such as magnetic ink character recognition (MICR) characters, to a financial data entry program. Generally speaking, the system 10 includes a server 18 and a client 22 connected via a distributed communications network 14.

The server 18 includes a computer 18, which is preferably a Unix server having a Unix based operating system. Other possible computers include an INTEL™ based computer employing a 32-bit architecture running a WINDOWS™ operating system, or an APPLE™ machine running an APPLE™ operating system. The server 18 includes a first communications port (not shown) and a first access program (not shown). The first access program allows the server to communicate with the distributed network 14 through the first communications port. The server 18 further includes at least one software program that converts financial characters entered by a user (not shown) into data or code recognizable by the server 18.

Preferably, the software programs of the server 18 include an on-line financial Web site, such as an electronic check Web site. The on-line financial Web site is written in Hypertext Mark-up Language (HTML). The software programs further include at least one JavaScript™ written using the JavaScript™ programming language. The on-line financial Web site incorporates the JavaScript™ when the Web site is "running". One of the JavaScript™ scripts to be incorporated is a MICR entry program capable of converting MICR characters entered by the user to data or code recognizable by the server.

In addition, the server 18 can include other hardware used in connection with the computer 18 to further provide additional features to the financial data entry program. Moreover, the server 18 can include additional software programs for use in providing other services relating to the financial data entry program.

The system 10 includes a client 22. The client 22 includes an electronic device 24, which is preferably a personal computer (PC). Alternatively, the electronic device can be a network computer terminal (e.g., a computer point of sale (POS) terminal or an automated teller machine (ATM)), a hand-held PC, an Internet appliance, a wireless device (e.g., a digital phone), or a similar device. One possible computer 24 is an INTEL™ based computer employing a 32-bit architecture running a WIDOWS™ operating system. Other types of computers with the appropriate operating system can be used.

The electronic device 24 includes a second communications port (not shown) and a second access program (not shown). The second access program allows the electronic device to communicate with the distributed communications network through the second communications port. Preferably, the second access program is any non-commercial or commercial software Web site browser (e.g., MICROSOFT EXPLORER™, AOL NETSCAPE NAVIGATOR™, etc.). The electronic device 24 also includes driver programs that allow the electronic device 24 to communicate with other hardware attached to the electronic device 24.

The client 22 further includes a visual display unit 30 in communication with the electronic device 24. Preferably, the visual display unit 30 is a computer monitor 30 which can be any known computer monitor. The visual display unit 30 has a corresponding driver program stored in the electronic device 24 allowing the electronic device 24 to communicate with the visual display unit 30. Other visual display units can be used including an analog or digital video monitor or television.

The client 22 further includes a keyboard 26 and a mouse 34 for allowing a user to input data to the electronic device 24. Of course, other data input devices can be used in place of the mouse including a keypad, trackball, touch screen, touchpad, pointing stick, or similar device. The data input devices 26 and 34 have a corresponding driver program stored in the electronic device 24 allowing the electronic device 24 to communicate with the data input devices 26 and 34. The corresponding driver program for the mouse 34 is a pointer driver program that generates a "pointer" on the computer monitor 30. The pointer driver program allows the pointer to be moved on the visual display unit 30 when a user manipulates the mouse 34.

The system 10 also includes a distributed communications network 14. The distributed network 14 can be a wide area network, local area network, Internet, intranet, extranet, or other hardware connections allowing communication between the server 18 and the client 22. However, in the preferred embodiment, the distributed communications network is the Internet.

In operation, a user (not shown) activates the Web site browser on the computer 24 allowing the user to view one or more Web sites from the Internet 14. Once the browser is activated, the user can seamlessly transfer to the different Web sites of the Internet 14. Some of the Web sites capable of being viewed allow the user to purchase goods and/or services via the Internet 14. An example of such a Web site is AMAZON.COM™. When the user decides to purchase goods and/or services via the Internet 14, the user is seamlessly linked to the electronic check Web site stored and maintained on the server 18. A first Web page of the electronic check Web site, including its related JavaScript™, is transmitted from the server 18 through the distributed network 14 to the client 24. After transmission, the Web page is visually displayed by the Web site browser on the monitor for the user to view.

The electronic check Web site may contain multiple Web pages having multiple JavaScript™ scripts which the user can view. One of the JavaScript™ scripts that is transmitted to the client 22 is the MICR entry program. When making an electronic check payment to the electronic check Web site, the user needs to enter the MICR line. The entering of the MICR line occurs after the MICR entry program is transmitted to the client 22 and is displayed by the browser at the computer 24.

Figure 2:
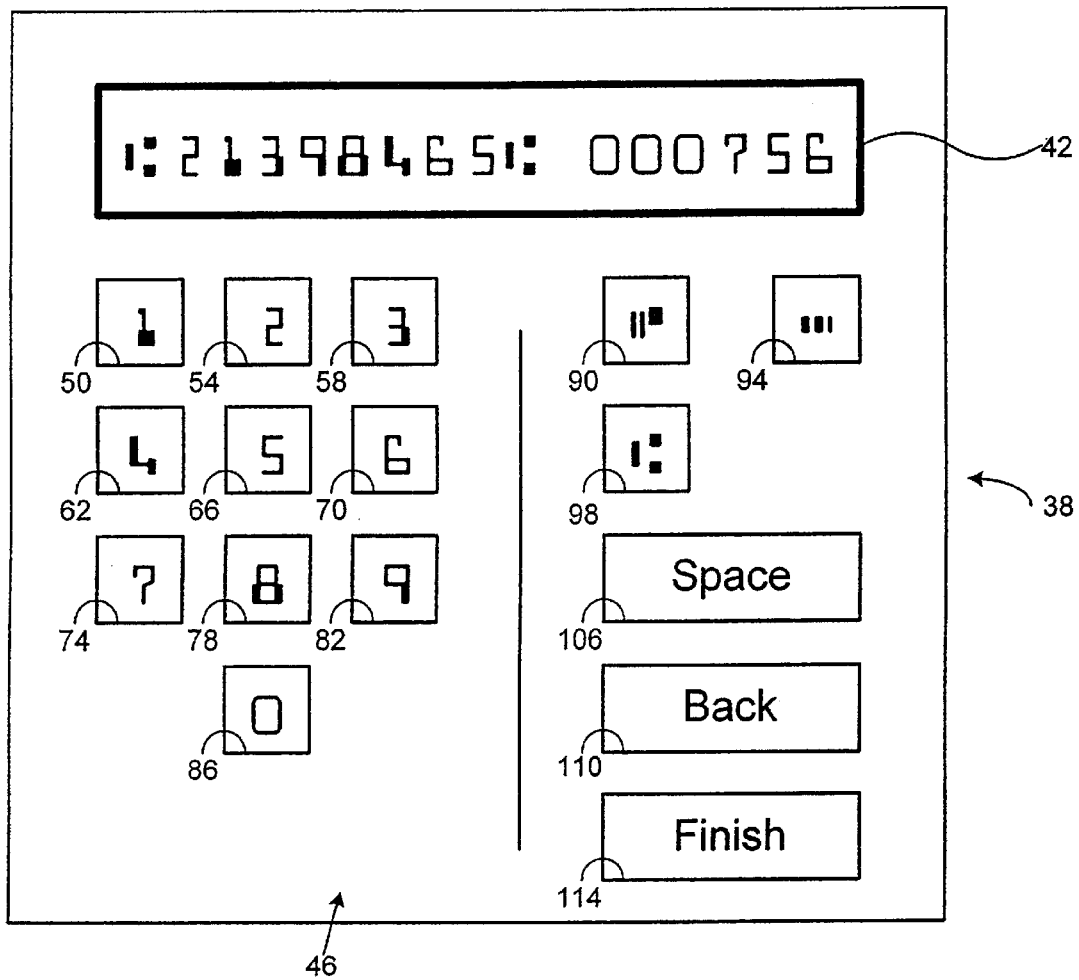
FIG. 2 is a representative view of a financial data-entry area.
Figure 3:
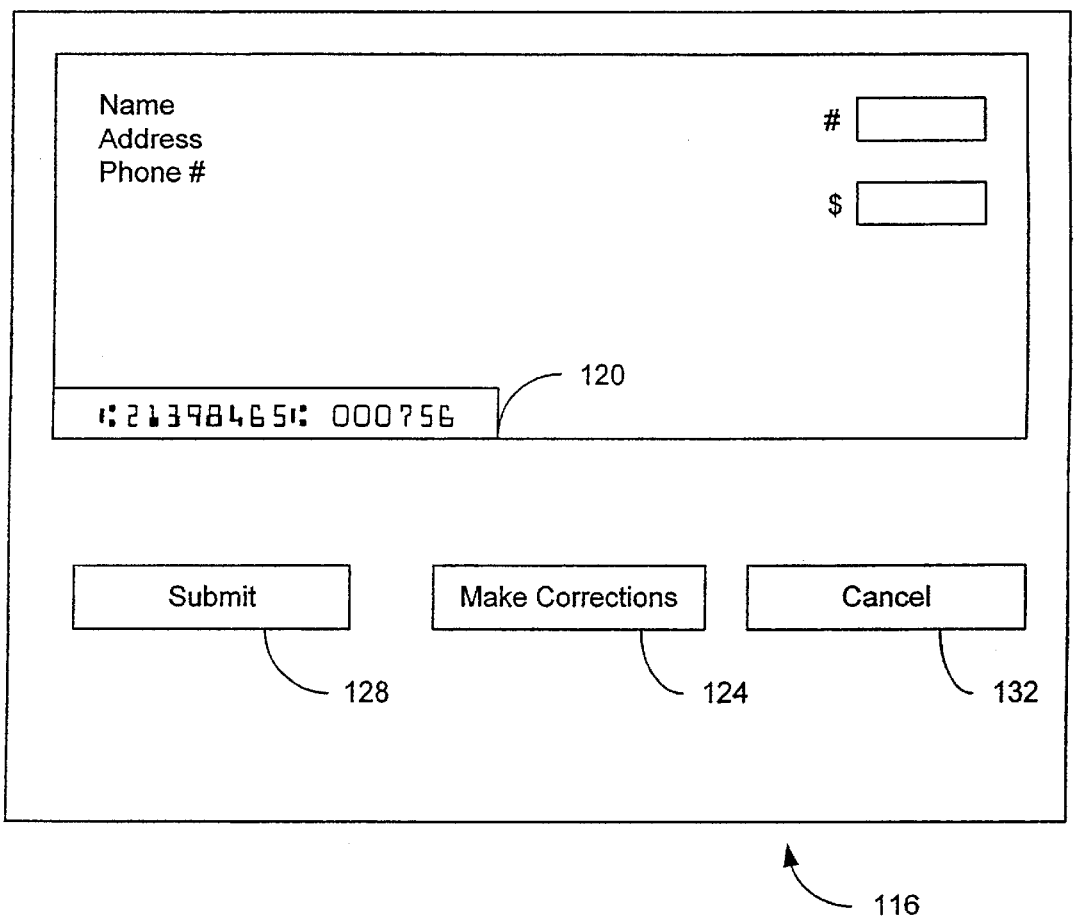
FIG. 3 is a representative view of a confirmation area.

The MICR entry program generates on the monitor 30 a MICR data entry area 38 as shown in FIG. 2. The MICR data entry area 38 includes a user entry area 46. The user entry area 46 includes a plurality of virtual entry buttons 50–114 (hereinafter, "entry buttons"). The entry buttons include MICR decimal number entry buttons 50, 54, 58, 62, 66, 70, 74, 78, 82 and 86, MICR financial symbol entry buttons 90, 94,and 98, a "space" entry button 106, a "back" entry button 110, and a "finish" entry button 114. The MICR decimal number entry buttons and the MICR financial symbol entry buttons are collectively known as the MICR character entry buttons. Each MICR character entry button has a unique MICR character displayed on the entry button. The financial data entry area 38 also includes a line display area 42 providing a visual indication of the MICR characters as the user is entering the characters. Of course, although the MICR character entry buttons 50–98 displayed in FIG. 2 are in a particular font, other fonts are possible. For example, the MICR decimal number entry buttons 50–86 may be displayed in an Arial font. In addition, other terms or words can be used to label the "space" entry button 106, "back" entry button 110, and "finish" entry button 114. The terms "space", "back" and "finish" are only exemplary labels. For example, the "finish" entry button can be labeled "complete".

The pointer driver program of the computer 24 generates a pointer on the monitor 30. As is commonly known in the art, the pointer on the monitor moves when a user manipulates the mouse 34. For example, if the user moves the mouse 34 forward on a flat surface, the pointer will move upward on the monitor 30. To enter the MICR code line into the electronic check Web site, the user manipulates the mouse 34 allowing the pointer to move on the monitor to within the financial data entry area 38. The user manipulates the mouse until the pointer is directly over one of the entry buttons and "clicks" the mouse to "activate" the entry button. For other data entry devices, the user may be required to take other actions to activate the entry buttons.

Upon activation of one of the MICR character entry buttons 50–98, a corresponding MICR character will be generated within the line display area 42. For example, if a MICR decimal number entry button 50, 54, 58, 62, 66, 70, 74, 78, 82 or 86 is activated, then the MICR number displayed on the entry button is generated in the line display area 42. Similarly, if a MICR symbol entry button 90, 94, or 98 is activated, then the MICR symbol displayed on the respective entry button is generated in the line display area 42. The MICR entry program will continuously add MICR characters to the line display area 42 as the user activates entry buttons 50–98. If the "space" entry button 106 is activated, a space will be generated in the display area 42. Lastly, if the "back" entry button 110 is activated, the last MICR character or space generated in the display area 42 will be erased and the user can enter new MICR characters at that point. Thus, a user can enter the MICR code line as seen on a physical check without deciphering the code line for the appropriate information.

In addition to the generation of the MICR characters in the line display area 42, the MICR entry program has the computer 24 maintain a temporary MICR entry field for storing the MICR code line. As a user depresses the entry buttons 50–98 a corresponding ASCII character is generated within the MICR entry field. For example, if one of the MICR decimal entry buttons 50, 54, 58, 62, 66, 70, 74, 78, 82 or 86 is depressed, a corresponding ASCII decimal number (i.e., "0", "1", "2", "3", "4", "5", "6", "7", "8", "9") is generated within the MICR entry field. Furthermore, if a MICR symbol entry button 90, 94, or 98 is depressed, a corresponding ASCII character is generated within the MICR entry field. For example, if the transit entry button is activated, an ASCII "T" is generated within the field. Similarly, if an "on-us" symbol or dash symbol is activated, then a ASCII "O" or "D" is generated.

When the user has finished entering the MICR code line, the user will activate the "finish" entry button 114. By activating this button 114, a confirmation area 116 is provided to the user. The confirmation area includes a second line display area 120 displaying the entered MICR entry field, a "make corrections" entry button 124, a "submit" entry button 128 and a "cancel" entry button 132. Of course, other terms or words can be used to label the "make corrections" entry button 124, "submit" entry button 128, and "cancel" entry button 132. The terms "make corrections", "submit" and "cancel" are only exemplary labels.

The confirmation screen allows the user to review the entered MICR code line and confirm the entered MICR line is correct before submitting the entered MICR line for analysis. Providing the confirmation screen allows the user to confirm the entered MICR code line without being preoccupied with entering the MICR characters. If the user discover an error in the MICR data that was entered, the user activates the "make corrections" entry button 124. Activating the "make corrections" button returns the user to the financial data entry area 38 allowing the user to correct the entered MICR line. If the user is satisfied with the entered MICR code line, the user activates the "submit" entry button 128. If the user wants to leave the MICR entry program without submitting MICR data to the server, the user activates the "cancel" entry button 132.

After activating the "submit" button, the client 22 transmits the MICR entry field through the distributed network 14 to the server 18. Once the MICR line is transmitted to the server 18, typographical data validation routines will be executed on the MICR code line. The typographical data validation routines minimize the number of "decline" responses received by the electronic check Web site as a result of typographical errors. One validation routine checks that there are nine digits between the routing symbols. Another data validation routine checks to make sure the MICR line has an "on-us" symbol at the end of the account number. Other typographical data validation routines may be added. If any of the validation routines fail, a JAVA™ servlet-generated message and the MICR entry program are transmitted back to the client 22 via the Internet 14 to ask the user to correct the error. After transmission, the data entry area 38 is displayed on the monitor with the erroneous MICR line, the error message and a possible correction message. The user can then attempt to correct the error by entering the correct MICR line. The method of reentering the MICR line is the same as entering the original MICR line. If the validation routines do not find any errors, then the MICR code line data will be provided to other check validation routines or programs at the server 18. Of course, one or more typographical data validation routines may be performed by the MICR entry program at the client.

As can be seen from the above, the present invention provides a method and apparatus for use in entering financial data. Various features and advantages of the invention are set forth in the following claims.

What is claimed is:

1. An entry system for use in entering magnetic ink character recognition (MICR) characters to an electronic device, the entry system comprising:
   a data input device in communication with the electronic device;
   a visual display unit in communication with the electronic device; and
   a software program for use in connection with the electronic device, the software program being operable to generate a command signal causing a plurality of virtual entry buttons to be displayed by the visual display unit, each virtual entry button corresponding to a respective MICR character, and the software program being operable to generate a respective computer recognizable data in response to user activation of one of the virtual entry buttons.

2. An entry system as set forth in claim 1, wherein the software program is operable to generate a second command signal causing a line display area to be displayed by the visual display unit, and wherein the software program is operable to generate a third command signal causing the MICR character to be displayed in the line display area when the user activates the respective virtual entry button.

3. An entry system as set forth in claim 1, wherein the electronic device is a personal computer.

4. An entry system as set forth in claim 3, wherein the electronic device is a hand-held personal computer.

5. An entry system as set forth in claim 1, wherein the electronic device is a network computer terminal.

6. An entry system as set forth in claim 5, wherein the network computer terminal is an automated teller machine.

7. An entry system as set forth in claim 5, wherein the network computer terminal is a point of sale terminal.

8. An entry system as set forth in claim 1, wherein the electronic device is an Internet appliance.

9. An entry system as set forth in claim 1, wherein the electronic device is a wireless device.

10. An entry system as set forth in claim 1, wherein the data input device is a keyboard.

11. An entry system as set forth in claim 1, wherein the data input device is a pointing device.

12. An entry system as set forth in claim 1, wherein the data input device is a mouse.

13. An entry system as set forth in claim 1, wherein the data input device is a pointing stick.

14. An entry system as set forth in claim 1, wherein the data input device is a trackball.

15. An entry system as set forth in claim 1, wherein the data input device is a touchpad.

16. An entry system as set forth in claim 1, wherein the data input device is a touch screen.

17. An entry system as set forth in claim 1, wherein the visual display unit is a digital video monitor.

18. An entry system as set forth in claim 1, wherein the visual display unit is an analog video monitor.

19. A system for use in entering magnetic ink character recognition (MICR) characters to an electronic device, the MICR characters including MICR numbers and MICR symbols, the entry system comprising:
   a manual data entry device in communication with the electronic device and being operable to allow a user to input the MICR symbols to the electronic device; and
   a software program for use in connection with the electronic device and being operable to generate computer recognizable code corresponding to the MICR characters.

20. A system for use in entering magnetic ink character recognition (MICR) characters to an electronic device, the entry system comprising:
   a manual data entry device in communication with the electronic device and being operable to allow a user to input the MICR characters to the electronic device;
   a software program for use in connection with the electronic device and being operable to generate computer recognizable code corresponding to the MICR characters;
   a visual display unit in communication with the electronic device; and
   wherein the software program is operable to generate a command signal causing a plurality of virtual entry buttons to be displayed by the visual display unit, each virtual entry button displays a respective MICR character, and wherein the software program is operable to generate a respective computer recognizable code when the user activates one of the virtual entry buttons with the manual data entry device.

21. A system as set forth in claim 20, wherein the software program is operable to generate a second command signal causing a line display area to be displayed by the visual display unit, and wherein the software program is operable to generate a third command signal causing the MICR character to be displayed in the line display area when the user activates the respective virtual entry button.

22. A system as set forth in claim 19, wherein the electronic device is a personal computer.

23. A system as set forth in claim 22, wherein the electronic device is a hand-held personal computer.

24. A system as set forth in claim 19, wherein the electronic device is a network computer terminal.

25. A system as set forth in claim 24, wherein the network computer terminal is an automated teller machine.

26. A system as set forth in claim 24, wherein the network computer terminal is a point of sale terminal.

27. A system as set forth in claim 19, wherein the electronic device is an Internet appliance.

28. A system as set forth in claim 19, wherein the electronic device is a wireless device.

29. A system as set forth in claim 19, wherein the data input device is a keyboard.

30. A system as set forth in claim 19, wherein the manual data entry device is a pointing device.

31. A system as set forth in claim 19, wherein the manual data entry device is a mouse.

32. A system as set forth in claim 19, wherein the manual data entry device is a pointing stick.

33. A system as set forth in claim 19, wherein the manual data entry device is a trackball.

34. A system as set forth in claim 19, wherein the manual data entry device is a touchpad.

35. A system as set forth in claim 19, wherein the manual data entry device is a touch screen.

36. A system as set forth in claim 19, wherein the visual display unit is a digital video monitor.

37. A system as set forth in claim 19, wherein the visual display unit is an analog video monitor.

38. A system as set forth in claim 19, wherein the MICR symbols include an on-us symbol.

39. A system as set forth in claim 19, wherein the MICR symbols include a transit symbol.

40. A system as set forth in claim 19, wherein the MICR symbols include a dash symbol.

41. A method of entering a magnetic ink character recognition (MICR) line into an electronic device, the MICR line having a plurality of MICR line characters including at least one MICR symbol, the method comprising:
    providing a manual data entry device in communication with the electronic device;
    inputting the first MICR line character with the manual data entry device;
    converting the first MICR line character into a first computer recognizable code; and
    repeating the acts of inputting the MICR line character and converting the MICR line character for the remaining plurality of MICR line characters.

42. A method as set forth in claims 41, the method further comprising:
    providing a visual display unit in communication with the electronic device;
    displaying the first MICR line character on the visual display unit after the first MICR line character is inputted; and
    displaying the remaining MICR line characters on the visual display unit after each MICR line character is inputted, the displayed MICR line characters forming an entered MICR line.

43. A method as set forth in claim 41, wherein the at least one MICR symbol includes an on-us symbol.

44. A method as set forth in claim 41, wherein the at least one MICR symbol includes a transit symbol.

45. A method as set forth in claim 41, wherein the at least one MICR symbol includes a dash symbol.

46. A method of entering a magnetic ink character recognition (MICR) line into an electronic device, the MICR line having a plurality of MICR line characters, the method comprising:
    providing a manual data entry device in communication with the electronic device;
    inputting the first MICR line character with the manual data entry device;
    converting the first MICR line character into a first computer recognizable code;
    repeating the acts of inputting the MICR line character and converting the MICR line character for the remaining plurality of MICR line characters;
    providing a visual display unit in communication with the electronic device;
    displaying a plurality of virtual entry buttons on the visual display unit;
    displaying respective MICR display characters on each virtual entry button; and
    wherein the acts of inputting the MICR line characters includes the act of activating one of the plurality of virtual entry buttons.

47. A method as set forth in claim 42, further comprising:
    providing a storage device resident in the electronic device; and
    storing the converted computer recognizable data in the storage device to form a computer recognizable MICR line.

48. A method as set forth in claim 47, further comprising:
    providing a communications port resident in the electronic device;
    providing a visual display unit in communication with the electronic device;
    displaying a finish virtual entry button on the visual display unit;
    activating the finish virtual entry button; and
    transmitting the computer recognizable data through the communications port after activating the finish virtual entry button.

49. A method as set forth in claim 47, further comprising:
    providing a visual display unit in communication with the electronic device;
    displaying a finish virtual entry button on the visual display unit;
    activating the finish virtual entry button; and
    performing typographical data validation routines on the computer recognizable MICR line.

50. A method as set forth in claim 49, wherein the computer recognizable MICR line comprises two routing symbols and at least nine decimal numbers, and wherein the act of performing typographical data validation routines includes the acts of:
    determining whether there are nine decimal numbers between the routing symbols.

51. A method as set forth in claim 46, further comprising:
    providing a visual display unit in communication with the electronic device;
    displaying a finish virtual entry button on the visual display unit;
    activating the finish virtual entry button; and
    providing a confirmation area on the visual display unit in response to the activation of the finish virtual entry button, the confirmation area comprising, the entered MICR line, a submit virtual entry button, and a make corrections virtual entry button.

52. A method as set forth in claim 51, further comprising:
    activating the submit virtual entry button after the user confirms the entered MICR line is correct.

53. A method as set forth in claim 51, further comprising:
    activating the make corrections virtual entry button after the user verifies the entered MICR line is incorrect.

54. A method as set forth in claim 51, further comprising:
    providing a communications port resident in the electronic device;
    activating the submit virtual entry button; and
    transmitting the computer recognizable data through the communications port after activating the correct virtual entry button.

55. A method of providing a magnetic ink character recognition (MICR) line from a client to a server, the MICR line including a plurality of MICR line characters, the client and server being in communication via a distributed network, and the client including a computer, a display unit, a storage device and a pointer device, the method comprising:

provinding a MICR line entry program at the server;

transmitting the MICR line entry program to the client;

displaying a plurality of virtual entry buttons with the display unit, each virtual entry button includes a MICR character and an associated computer recognizable code;

displaying a finish virtual entry button with the display unit;

displaying a pointer with the visual display unit;

controlling the pointer device to move a pointer over one of the virtual entry buttons;

activating the virtual entry button;

storing the associated computer recognizable code after the respective virtual entry button is activated;

displaying the MICR character on the display unit after the respective virtual entry button is activated;

repeating the acts of controlling the pointer device, activating the virtual entry button, storing the associated computer recognizable code and displaying the MICR character on the display unit for the remaining line characters, the repeating act results in a computer recognizable MICR line and an entered MICR line;

controlling the pointer device to move a pointer over the finish virtual entry button;

activating the finish virtual entry button; and transmitting the computer recognizable MICR line to the server.

56. A method as set forth in claim 55, the method further comprising:

performing typographical validation routines on the computer recognizable MICR line.

57. A method as set forth in claim 56, wherein the computer recognizable MICR line comprises two routing symbols and at least nine decimal numbers, and wherein the act of performing typographical data validation routines includes the acts of:

determining whether there are nine decimal numbers between the routing symbols.

58. A method as set forth in claim 55, wherein after the act of activating the finish virtual entry button and before the act of transmitting the computer recognizable MICR line, the method further comprising:

providing a confirmation area on the visual display unit, the confirmation area comprising, the entered MICR line, a submit virtual entry button, and a correct virtual entry button; and activating the submit virtual entry button after the user confirms the entered MICR line is correct.

* * * * *